United States Patent
Aymes et al.

(10) Patent No.: US 9,618,601 B2
(45) Date of Patent: Apr. 11, 2017

(54) METHOD AND SYSTEM FOR ESTIMATING THE DIRECTION OF ARRIVAL OF A TARGET SIGNAL RELATIVE TO A SATELLITE

(71) Applicant: AIRBUS DEFENCE AND SPACE SAS, Les Mureaux (FR)

(72) Inventors: Jean-Marc Aymes, Saint Orens de Gameville (FR); Raphael Sanchez, Balma (FR); Frederic Voulouzan, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 50 days.

(21) Appl. No.: 14/404,594

(22) PCT Filed: Feb. 25, 2014

(86) PCT No.: PCT/EP2014/053583
§ 371 (c)(1),
(2) Date: Nov. 28, 2014

(87) PCT Pub. No.: WO2014/128304
PCT Pub. Date: Aug. 28, 2014

(65) Prior Publication Data
US 2015/0355312 A1 Dec. 10, 2015

(30) Foreign Application Priority Data
Feb. 25, 2013 (FR) ...................................... 13 00424

(51) Int. Cl.
*G01S 3/48* (2006.01)
*H04B 7/185* (2006.01)
(Continued)

(52) U.S. Cl.
CPC .............. *G01S 3/48* (2013.01); *G01S 5/0247* (2013.01); *H04B 7/18554* (2013.01); *G01S 5/12* (2013.01)

(58) Field of Classification Search
CPC .................................... G01S 3/48; G01S 19/24
(Continued)

(56) References Cited

U.S. PATENT DOCUMENTS 5,555,257 A * 9/1996 Dent ...................... H01Q 1/246
342/352
6,147,640 A 11/2000 Wachs
(Continued)

OTHER PUBLICATIONS

Schmidt, "Multiple Emitter Location and Signal Parameter Estimation", IEEE Transactions on Antennas and Propagation, Mar. 1986, pp. 276-280, vol. 34, No. 3.
(Continued)

*Primary Examiner* — Dao Phan
(74) *Attorney, Agent, or Firm* — Im IP Law; C. Andrew Im

(57) ABSTRACT

A method and system for estimating a direction of arrival of a target signal relative to a measuring antenna array of an earth-orbiting satellite. The direction of arrival of the target signal being estimated on the basis of measurement signals corresponding to the target signal received respectively by at least a first measuring antenna and a second measuring antenna of the measuring antenna array. Each of the measurement signals are combined with a reference signal corresponding to the target signal received by a receiving antenna of the satellite. The receiving antenna has a maximum gain greater than the respective maximum gains of the first measuring antenna and of the second measuring antenna. The direction of arrival of the target signal is estimated from the signals obtained by combining the measurement signals with the reference signal.

15 Claims, 2 Drawing Sheets

Figure 1:
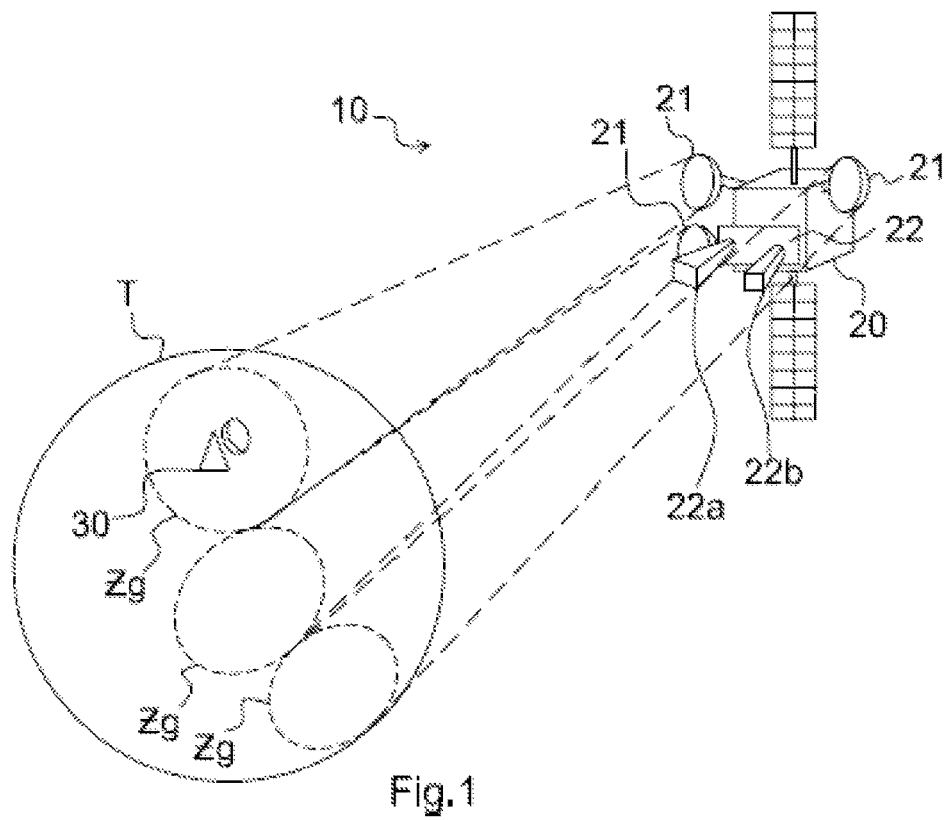

(51) Int. Cl.
  *G01S 5/02* (2010.01)
  *G01S 5/12* (2006.01)
(58) Field of Classification Search
  USPC ....... 342/352, 417, 437, 445; 455/12.1, 13.1
  See application file for complete search history.

(56) References Cited

U.S. PATENT DOCUMENTS

2006/0082501 A1     4/2006  Chiang
2014/0362896 A1*  12/2014  Aymes ............... H04B 7/18519
                                                                  375/226

OTHER PUBLICATIONS

Roy et al., "ESPRIT—Estimation of Signal Parameters Via Rotational Invariance Techniques", IEEE Transactions on Acoustics, Speech, and Signal Processing, Jul. 1989, pp. 984-995, vol. 37, No. 7.

* cited by examiner

METHOD AND SYSTEM FOR ESTIMATING THE DIRECTION OF ARRIVAL OF A TARGET SIGNAL RELATIVE TO A SATELLITE

RELATED APPLICATIONS

This application is a §371 application from PCT/EP2014/053583 filed Feb. 25, 2014, which claims priority from French Patent Application No. 13 00424 filed Feb. 25, 2013, each which is incorporated herein by reference in its entirety.

TECHNICAL FIELD

The present invention belongs to the field of satellite systems, and relates more particularly to a method and a system for a estimating direction of arrival of a target signal with respect to an array of measurement antennas of a satellite in terrestrial orbit.

The present invention finds particularly advantageous, although nonlimiting, applications in respect of the estimation of the position of emitters substantially on the surface of the Earth and/or the estimation of attitude of satellites in terrestrial orbit.

PRIOR ART

A telecommunications satellite generally comprises several reception antennas for receiving telecommunications signals emitted from the Earth, said reception antennas servicing different geographical zones. Such a telecommunications satellite also comprises one or more emission antennas for retransmitting said telecommunications signals toward the Earth.

It is not rare for interference signals to be received by one or more reception antennas of a telecommunications satellite. Such interference signals may lead to a degradation of the services offered by the telecommunications satellite.

In order to be able to reduce or remove an interference signal, it may be useful to ascertain the position of an interferer from which this interference signal originates. Once this position has been ascertained, it is for example possible to intervene on site so as to interrupt the emission of the interference signal.

As an alternative, in the case of reception antennas whose radiation pattern is modifiable (for example in the case of a reception antenna formed by an array of elementary reception antennas), said radiation pattern can be modified so as to strongly attenuate all the signals received in the direction of arrival of the interference signal.

To estimate the direction of arrival of an interference signal, it is known from patent U.S. Pat. No. 6,147,640 to furnish the telecommunications satellite with an array of measurement antennas implemented to perform interferometric measurements on the interference signal, an interferometric measurement being an estimation of the phase difference between signals, referred to as "measurement signals", received by two different measurement antennas and corresponding to the interference signal. Such interferometric measurements can, in a known manner, be used to estimate the direction of arrival of the interference signal with respect to the array of measurement antennas.

However, the solution described in U.S. Pat. No. 6,147,640 exhibits limitations.

Indeed, by considering for example a satellite in geostationary orbit at an altitude of about 36 000 kilometers, each measurement antenna will have to exhibit a significant gain in order to be able to detect any interference signal. Accordingly, each measurement antenna will have significant and bulky dimensions. Furthermore, each measurement antenna will then exhibit a narrow field of view, so that the geographical coverage, in which an interferer might be located, will be reduced.

In the converse case, that is to say in the case of measurement antennas of low gain and bulk, only very strong interference signals will be able to be detected by the solution described in patent U.S. Pat. No. 6,147,640 so that, in practice, numerous cases of interference signals will not be able to be detected or located.

SUMMARY OF THE INVENTION

The objective of the present invention is to remedy all or some of the limitations of the solutions of the prior art by proposing a solution which makes it possible to estimate the direction of arrival of target signals with reduced bulkiness with respect to the solutions of the prior art (while having significant geographical coverage), and/or which makes it possible to estimate the direction of arrival of weaker target signals than with the solutions of the prior art.

Furthermore, the objective of the present invention is also to propose a solution which is simple and inexpensive to implement.

For this purpose, and according to a first aspect, the invention relates to a method for estimating a direction of arrival of a target signal with respect to an array of measurement antennas of a satellite in terrestrial orbit, said direction of arrival of the target signal being estimated as a function of signals, referred to as "measurement signals", corresponding to the target signal received by respectively at least a first measurement antenna and a second measurement antenna of said array of measurement antennas. Said method comprises steps of:

combining each of the measurement signals with a signal, referred to as the "reference signal", corresponding to the target signal received by a reception antenna of the satellite, said reception antenna being of greater maximum gain than the respective maximum gains of the first measurement antenna and of the second measurement antenna, estimating the direction of arrival of the target signal on the basis of the signals obtained by combining each of said measurement signals with the reference signal.

Because the reference signal corresponds to the target signal received by a reception antenna exhibiting a maximum gain greater than the respective maximum gains of the first and second measurement antennas, it is understood that the target signal to noise ratio of the reference signal is greater than the target signal to noise ratios of the measurement signals.

Consequently, the signals obtained after combining exhibit a better target signal to noise ratio than the measurement signals. This improvement in the target signal to noise ratio makes it possible to improve the performance of the estimation of the direction of arrival of said target signal and/or renders this estimation of the direction of arrival possible for target signals which were not detected by the solutions of the prior art, on account of too low a reception level.

This improvement in the target signal to noise ratio also makes it possible, with respect to the solutions of the prior art, to perform measurements with smaller measurement times for equivalent precision.

Moreover, the proposed solution renders the estimation of the direction of arrival possible for intermittent target signals and / or signals of time varying frequency. For example, the solution renders possible the estimation of the direction of arrival of signals emitted in particular by:
- a radar, or
- a particular terminal of a telecommunications system based on Time Division Multiple Access (TDMA), such as a VSAT terminal, or
- a terminal sweeping a span of frequencies subsequent to a fault (and known as a "sweeper"), etc.

Since the use of the reference signal makes it possible to improve the target signal to noise ratio, the constraint on the maximum gains of the first and second measurement antennas can furthermore be relaxed. Said first and second measurement antennas can be fairly non-directional, and therefore not be very bulky while having a significant geographical coverage.

In particular modes of implementation, the method for estimating direction of arrival can furthermore comprise one or more of the following characteristics, taken in isolation or according to all technically possible combinations.

In a particular mode of implementation, the satellite comprising several reception antennas servicing various geographical zones of the Earth, each reception antenna being of greater maximum gain than the respective maximum gains of the first and second measurement antennas, and the first measurement antenna and the second measurement antenna servicing all the geographical zones serviced by the various reception antennas, said method comprises a step of determining the reception antenna by which the target signal is received, the signal received by the determined reception antenna being used as reference signal.

Such provisions make it possible to improve the target signal to noise ratio insofar as the signals originating from geographical zones different to that from which the target signal has been emitted will be attenuated.

In a particular mode of implementation, in the course of the combining step:
- a first combination is calculated between the reference signal and the measurement signal that are received by respectively the reception antenna and the first measurement antenna in the course of a first time interval,
- a second combination is calculated between the reference signal and the measurement signal that are received by respectively the reception antenna and the second measurement antenna in the course of a second time interval, distinct from the first time interval, the direction of arrival of the target signal being estimated as a function at least of said first and second combinations.

In a particular mode of implementation, at least one hardware resource of chains for processing the measurement signals aboard the satellite is implemented to process both the measurement signal of the first measurement antenna and the measurement signal of the second measurement antenna in the course of different respective time intervals.

Such provisions make it possible to reduce, for the satellite, the cost overhead related to the estimation of the direction of arrival.

In a particular mode of implementation, at least one hardware resource implemented to process both the measurement signal of the first measurement antenna and the measurement signal of the second measurement antenna in the course of different respective time intervals is an analog-digital converter or a low noise amplifier or a frequency conversion module.

In a particular mode of implementation, the satellite is a telecommunications satellite or a satellite for observation of artificial signals emitted from the Earth, and each reception antenna is a reception antenna for a telecommunications or observation payload of said satellite.

Such provisions make it possible to have a telecommunications or observation satellite for which the cost overhead related to the estimation of direction of arrival is reduced. Indeed, it is not necessary to add any reception antenna to provide the reference signal since the reception antenna or antennas of the telecommunications or observation payload are implemented both for their telecommunications or observation mission, and also to provide the reference signal used to estimate the direction of arrival of the target signal. On such a satellite, it will therefore suffice to add the array of measurement antennas, said measurement antennas being able to be fairly non-directional and not very bulky on account of the processing gain introduced by combining the measurement signals with the reference signal.

According to a second aspect, the invention relates to a method for estimating a position of an emitter substantially on the surface of the Earth, in which the position of said emitter is estimated as a function in particular of a direction of arrival estimated, for a target signal emitted by said emitter, in accordance with an estimation method according to the invention.

According to a third aspect, the invention relates to a method for estimating an attitude of a satellite, said satellite comprising at least a first measurement antenna, a second measurement antenna and a reception antenna of greater maximum gain than the respective maximum gains of said first measurement antenna and of said second measurement antenna. The attitude of the satellite is estimated as a function in particular of a direction of arrival estimated, for a target signal emitted by an emitter of known position with respect to the satellite, in accordance with a method for estimating direction of arrival according to the invention.

According to a fourth aspect, the invention relates to a computer program product comprising a set of program code instructions which, when they are executed by a processor, implement a method for estimating direction of arrival according to the invention.

According to a fifth aspect, the invention relates to a system for estimating a direction of arrival of a target signal with respect to an array of measurement antennas of a satellite in terrestrial orbit, said direction of arrival of the target signal being estimated as a function of signals, referred to as "measurement signals", corresponding to the target signal received by respectively at least a first measurement antenna and a second measurement antenna of said array of measurement antennas. Said system furthermore comprises:
- combining means suitable for combining each of the measurement signals with a signal, referred to as the "reference signal", corresponding to the target signal received by a reception antenna of the satellite, said reception antenna being of greater maximum gain than the respective maximum gains of the first measurement antenna and of the second measurement antenna,
- estimating means suitable for estimating the direction of arrival of the target signal on the basis of the signals obtained by combining each of said measurement signals with the reference signal.

In particular embodiments, the system for estimating direction of arrival can furthermore comprise one or more of the following characteristics, taken in isolation or according to all technically possible combinations.

In a particular embodiment, the satellite comprises several reception antennas servicing various geographical zones of the Earth, each reception antenna being of greater maximum gain than the respective maximum gains of the first measurement antenna and of the second measurement antenna, and said first measurement antenna and said second measurement antenna service all the geographical zones serviced by the various reception antennas.

In a particular embodiment, the satellite comprises chains for processing the measurement signals, said processing chains comprising at least one shared hardware resource implemented to process both the measurement signal of the first measurement antenna and the measurement signal of the second measurement antenna in the course of different respective time intervals.

In a particular embodiment, at least one shared hardware resource of the processing chains of the satellite is an analog-digital converter or a low noise amplifier or a frequency conversion module.

In a particular embodiment, the satellite is a telecommunications satellite or a satellite for observation of artificial signals emitted from the Earth, and each reception antenna is a reception antenna for a telecommunications or observation payload of said satellite, preferably a payload suitable for receiving AIS, GNSS or ADS-B signals, or any other artificial signal emitted from the Earth (radar, etc.).

In a particular embodiment, the satellite is in geostationary orbit, and the first measurement antenna and the second measurement antenna each exhibit a field of view of width greater than 3°, preferably greater than 10°.

PRESENTATION OF THE FIGURES

Figure 2:
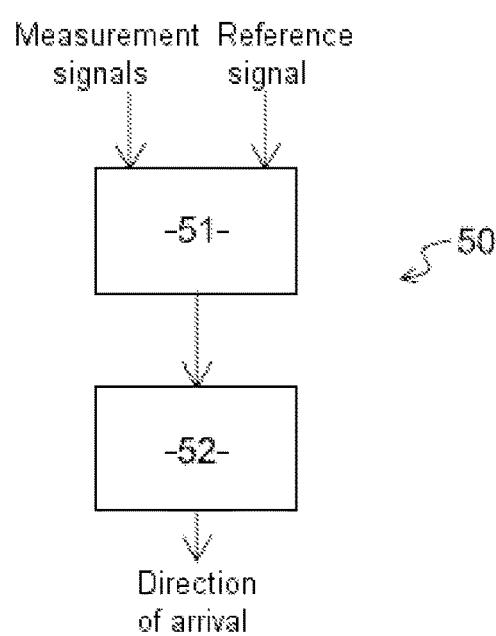
Figure 3:
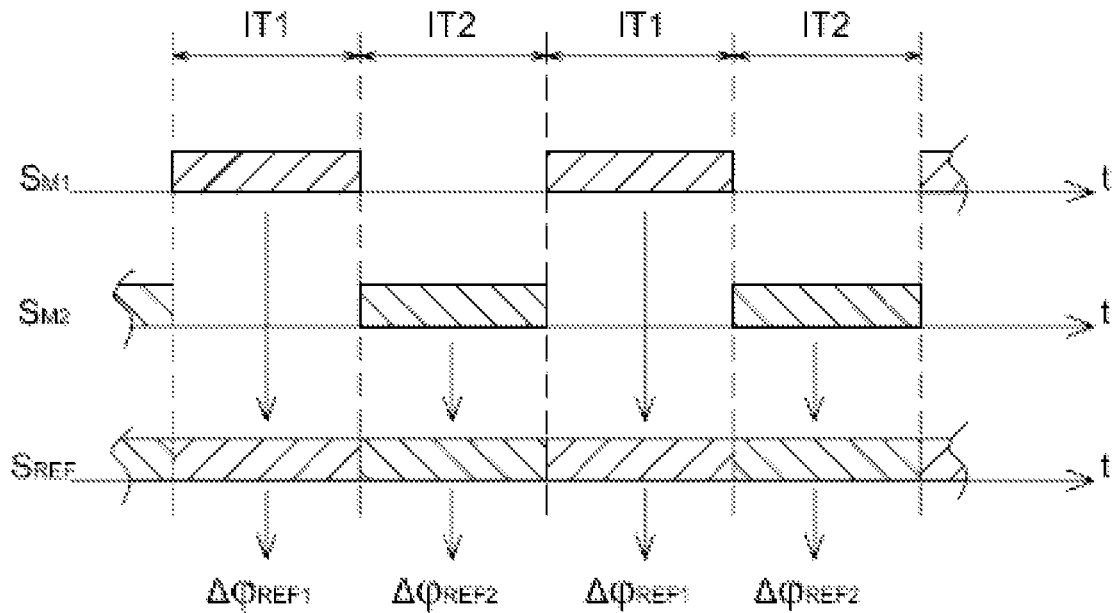
Figure 4:
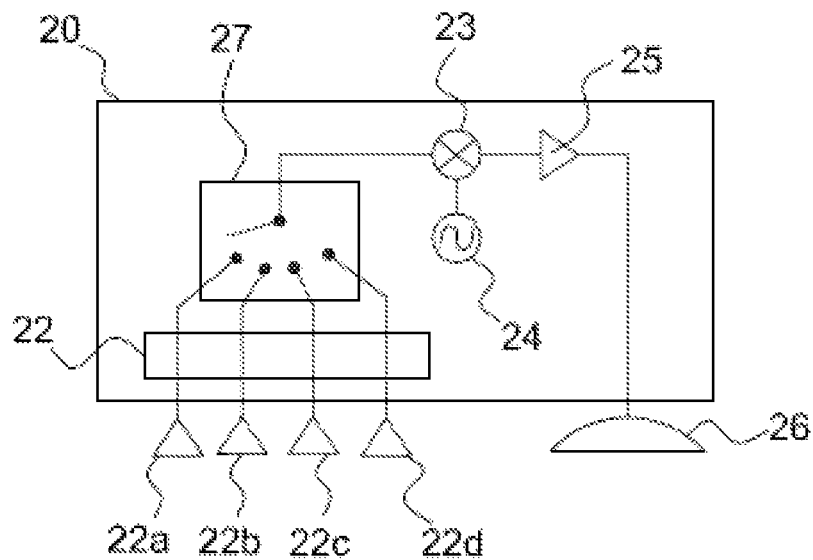

The invention will be better understood on reading the following description, given by way of wholly non-limiting example, and while referring to the figures which represent:

FIG. 1: a schematic representation of a system for estimating direction of arrival according to an exemplary embodiment, FIG. 2: a chart illustrating the main steps of a method for estimating direction of arrival according to the invention, FIG. 3: a chart illustrating an exemplary implementation of a method for estimating direction of arrival, FIG. 4: a partial schematic representation of an exemplary embodiment of a satellite of a system for estimating direction of arrival.

In these figures, references that are identical from one figure to another designate identical or analogous elements. For the sake of clarity, the elements represented are not to scale, unless stated otherwise.

DETAILED DESCRIPTION OF EMBODIMENTS

FIG. 1 schematically represents an exemplary embodiment of a system 10 for estimating direction of arrival of a target signal, comprising a satellite 20 in terrestrial orbit.

In the subsequent description, the non-limiting case is considered where the satellite 20 is a telecommunications satellite in geostationary orbit. Nothing excludes, following other examples, consideration of other types of satellites (for example for observation of artificial signals emitted from the Earth) and/or of other types of orbits (LEO, MEO, etc.).

The satellite 20 comprises a telecommunications payload comprising in particular several reception antennas 21 servicing various geographical zones Zg on the surface of the Earth T.

The telecommunications payload is for example suitable for receiving AIS ("Advanced Identification System"), GNSS ("Global Navigation Satellite System"), ADS-B ("Automatic Dependent Surveillance-Broadcast") signals, etc. The telecommunications payload of the satellite 20 can be transparent or regenerative, or else limited to a reception function without Earth-ward repetition capability.

In the context of the invention, the direction of arrival of a target signal is estimated as a function of signals, referred to as "measurement signals", corresponding to the target signal emitted from the Earth and received by an array 22 of measurement antennas, which are distinct from the reception antennas 21 of the satellite 20. The direction of arrival is therefore estimated with respect to said array of measurement antennas, which comprises at least a first measurement antenna 22a and a second measurement antenna 22b.

The target signal can be any type of signal, including an interference signal which disturbs the telecommunications mission of the satellite 20, or a useful signal corresponding to a telecommunications signal, a calibration signal, a signal emitted by an emitter of known position (so as in particular to estimate the attitude of the satellite), etc.

In a known manner, the direction of arrival of a target signal with respect to the first and second measurement antennas 22a, 22b is for example estimated as a function of an estimation of the phase difference between the measurement signals. Such an estimation of the phase difference, referred to as an "interferometric measurement", makes it possible to determine a difference of path length between paths traveled by the target signal to arrive at respectively the first measurement antenna 22a and the second measurement antenna 22b, which may in its turn be used to estimate the direction of arrival of the target signal.

It should be noted that the estimation of the difference of path length by means of the estimation of the phase difference may turn out to be ambiguous, insofar as the phase is estimated modulo $2\pi$. However, this ambiguity can be removed by means which are outside the scope of the invention and which are considered to be known to the person skilled in the art.

The direction of arrival of the target signal with respect to the first and second measurement antennas 22a, 22b can also be estimated, on the basis of the measurement signals, by applying more complex algorithms, better suited to scenarios in which several signals, target signal included, are received by the array 22 of measurement antennas. The following algorithms may be cited by way of nonlimiting examples:

MUSIC (see for example: "Multiple Emitter Location and Signal Parameter Estimation", R. O. Schmidt, IEEE Transactions on Antennas and Propagation, Vol. 34, No. 3, March 1986), ESPRIT (see for example "ESPRIT: Estimation of Signal Parameters via Rotational Invariance Techniques", R. Roy et al., IEEE Transactions on Acoustics, Speech and Signal Processing, Vol. 37, No. 7, July 1989).

In the example illustrated by FIG. 1, the satellite 20 comprises only two measurement antennas, in this instance the first measurement antenna 22a and the second measurement antenna 22b. Nothing excludes, following other examples, consideration of more than two measurement antennas. In particular, it is advantageous to consider at least three measurement antennas that are not all aligned if it is desired to be able to estimate a 3D direction of arrival of the target signal in a reference frame associated with the satellite 20.

Advantageously, each reception antenna 21 is of greater maximum gain than the respective maximum gains of the first measurement antenna 22a and of the second measurement antenna 22b. The reception antennas 21 are therefore more directional than the first and second measurement antennas 22a, 22b. Each of the first and second measurement antennas 22a, 22b therefore services a larger geographical zone than that serviced by a reception antenna 21. The maximum gain of each reception antenna is for example at least 3 decibels (dB) greater than the maximum gains of the first and second measurement antennas 22a, 22b. In preferred embodiments, said maximum gain of each reception antenna is at least 10 decibels (dB) greater than said maximum gains of the first and second measurement antennas 22a, 22b.

In a preferred embodiment, each of the first and second measurement antennas 22a, 22b services all the geographical zones serviced by the various reception antennas 21 of the satellite 20. Thus, the first and second measurement antennas 22a, 22b can be implemented to estimate the direction of arrival of a target signal originating from any one of the geographical zones serviced by the various reception antennas 21 of the satellite 20. For example, the first measurement antenna 22a and the second measurement antenna 22b each exhibit a field of view of width greater than 3°, or indeed greater than 10°. The field of view of the first and second measurement antennas 22a, 22b is for example of width substantially equal to 17° so as to simultaneously cover the whole of the terrestrial surface visible from a satellite in geostationary orbit.

Generally, the main steps, illustrated by FIG. 2, of a method 50 for estimating direction of arrival according to the invention are the following:
- 51 combining each of the measurement signals with a signal, referred to as the "reference signal", corresponding to the target signal received by one of the reception antennas 21 of the satellite 20,
- 52 estimating the direction of arrival of the target signal on the basis of the signals obtained by combining each of said measurement signals with the reference signal.

In practice, when the target signal corresponds to an interference signal, the reception antenna 21 considered will correspond for example to the reception antenna 21 that made it possible to detect said interference signal. If several reception antennas 21 allow the detection of said interference signal, it will be possible for example to consider the one exhibiting the highest level of reception of said interference signal.

In a context of estimation of attitude of the satellite 20, several target signals will be able to be considered, emitted by various emitters of known positions, preferably situated in different respective geographical zones. Thus, for each target signal whose direction of arrival it is sought to estimate, the reception antenna 21 by which said target signal is received will be used, that is to say the reception antenna 21 servicing the geographical zone in which the emitter of said target signal is situated.

The system 10 for estimating direction of arrival furthermore comprises means configured to execute the steps of the method 50 for estimating direction of arrival. Consequently, it comprises in particular:
- combining means suitable for combining each of the measurement signals with the reference signal,
- estimating means suitable for estimating the direction of arrival of the target signal on the basis of the signals obtained by combining each of said measurement signals with the reference signal.

It should be noted that the combining means and the estimating means can be entirely on board the satellite 20, entirely integrated into a ground station 30, or else distributed between said satellite 20 and said ground station 30.

In the subsequent description, the non-limiting case is considered where the combining means and the estimating means are entirely integrated into the ground station 30. In such a case, the satellite 20 comprises means for reemitting the reference signal and measurement signals received, destined for the ground station 30. Several configurations are possible at the level of the satellite 20, depending on whether analog and/or digital versions of the reference signal and measurement signals are transmitted to the ground station 30. For example:
- an analog version of the reference signal (transparent or regenerative satellite 20) and analog versions of the measurement signals are transmitted to the ground station 30,
- an analog version of the reference signal and digital versions of the measurement signals (onboard digitization of the measurement signals) are transmitted to the ground station 30,
- a digital version of the reference signal (onboard digitization of the reference signal) and digital versions of the measurement signals are transmitted to the ground station 30.

At the level of the ground station 30, the combining means and the estimating means take for example the form of a processor and of an electronic memory in which a computer program product is stored. The computer program product takes the form of a set of program code instructions which, when they are executed by the processor, implement all or some of the steps of the method 50 for estimating direction of arrival. In a variant, the combining means and/or the estimating means comprise programmable logic circuits, of FPGA, PLD type, etc., and/or specialized integrated circuits (ASIC), suitable for implementing all or part of the steps of said method 50 for estimating direction of arrival.

Diverse combinations of the measurement signals with the reference signal can be envisaged.

In a preferred mode of implementation, combination of the reference signal with a measurement signal comprises a calculation of correlation of said reference signal with said measurement signal. In a known manner, the signal obtained after combination is then representative of the phase difference between the target signal such as received by the reception antenna 21 and the target signal such as received by the measurement antenna considered. Thus, completion of the combining step 51 yields two signals representative of:
- the phase difference $\Delta\phi_{REF1}=\phi_{REF}-\phi_1$ between the phase $\phi_{REF}$ of the reference signal and the phase $\phi_1$ of the measurement signal of the first measurement antenna 22a,
- the phase difference $\Delta\phi_{REF2}=\phi_{REF}-\phi_2$ between the phase $\phi_{REF}$ of the reference signal and the phase $\phi_2$ of the measurement signal of the second measurement antenna 22b.

Thereafter, step 52 of estimating the direction of arrival comprises for example sub-steps (not illustrated by figures) of:
- estimating the phase difference between the signals obtained after combination,
- estimating the direction of arrival on the basis of the phase difference between the signals obtained after combination.

In the course of the sub-step of estimating the phase difference between the measurement signals, the correlation is calculated between for example:
- the signal obtained by combining the reference signal with the measurement signal of the first measurement antenna 22a, and
- the signal obtained by combining said reference signal with the measurement signal of the second measurement antenna 22b.

The argument of the result of the correlation calculation is thereafter calculated, which corresponds to the estimation of the phase difference between said signals obtained by combination. Thus, completion of the sub-step of estimating the phase difference between the signals obtained after combination therefore yields an estimation of the difference:

$$\Delta\phi_{REF1} - \Delta\phi_{REF2} = \phi_{REF} - \phi_1 - \phi_{REF} + \phi_2 = \phi_2 - \phi_1$$

that is to say an estimation of the phase difference $\Delta\phi_{21}$ between the phase $\phi_2$ of the measurement signal of the second measurement antenna 22b and the phase $\phi_1$ of the measurement signal of the first measurement antenna 22a.

It should be noted that, by considering fairly non-directional first and second measurement antennas 22a, 22b (for example exhibiting an angular width of 17° for a satellite 20 in geostationary orbit), it would in practice be very difficult to directly estimate the phase difference $\Delta\phi_{21}$ without undertaking combination with the reference signal. Indeed, the target signal to noise ratio, in each of the measurement signals, would usually be too low on account of a low maximum gain of each of said first and second measurement antennas 22a, 22b. Combination with the reference signal, which exhibits a much better target signal to noise ratio, makes it possible to introduce a processing gain. Thus, it is possible to estimate the phase differences $\Delta\phi_{REF1}$ and $\Delta\phi_{REF2}$, and thereafter to estimate the phase difference $\Delta\phi_{21}$ with a better target signal to noise ratio than by considering only the measurement signals of the first and second measurement antennas.

The estimation of the direction of arrival, on the basis of the estimation of the phase difference between the measurement signals, can be carried out in a conventional manner, by implementing methods considered to be known to the person skilled in the art. As previously indicated, the estimation of the phase difference being performed modulo $2\pi$, it may turn out to be necessary to remove the residual ambiguity, by implementing methods which are also considered to be known to the person skilled in the art.

In a particular mode of implementation, that may be considered alone or in combination with any one of the previously described modes of implementation, it is possible to estimate, in the course of the combining step 51, the phase difference $\Delta\phi_{REF1}$ and the phase difference $\Delta\phi_{REF2}$. On the basis of these phase differences $\Delta\phi_{REF1}$ and $\Delta\phi_{REF2}$, it is possible to estimate the differences of path length between respectively:
- the paths traveled by the target signal to arrive at the reception antenna 21 and the first measurement antenna 22a,
- the paths traveled by the target signal to arrive at the reception antenna 21 and the second measurement antenna 22b.

These differences of path length can then be used to estimate the direction of arrival of the target signal (3D direction if the reception antenna 21 and the first and second measurement antennas are not aligned).

In an alternative mode of implementation, the direction of arrival of the target signal can be estimated directly on the basis of the signals obtained after combination, by implementing algorithms such as MUSIC or ESPRIT, which are considered to be known to the person skilled in the art. It should be noted that such algorithms can be implemented to simultaneously process more than two signals obtained after combination. Thus, in the case of an array 22 comprising Nr measurement antennas, Nr being equal to or greater than 3, the direction of arrival of the target signal can be estimated directly on the basis of the Nr signals obtained after combining the various measurement signals with the reference signal.

FIG. 3 represents a preferred mode of implementation of a method 50 for estimating direction of arrival, in which, in the course of the combining step 51:
- a first combination is calculated between the reference signal and the measurement signal that are received by respectively the reception antenna 21 and the first measurement antenna 22a in the course of a first time interval IT1,
- a second combination is calculated between the reference signal and the measurement signal that are received by respectively the reception antenna 21 and the second measurement antenna 22b in the course of a second time interval IT2, distinct from said first time interval IT1.

Thus the signal representative of the phase difference $\Delta\phi_{REF1}$ is obtained by combining the reference signal (designated by $S_{REF}$ in FIG. 3) received in the course of the first time interval IT1 with the measurement signal of the first measurement antenna 22a (designated by $S_{M1}$ in FIG. 3) received in the course of the same first time interval IT1.

The signal representative of the phase difference $\Delta\phi_{REF2}$ is obtained by combining the reference signal $S_{REF}$ received in the course of the second time interval IT2 with the measurement signal of the second measurement antenna 22b (designated by $S_{M2}$ in FIG. 3) received in the course of the same second time interval IT2.

Thereafter, the direction of arrival of the target signal is estimated as described previously by using the first combination and the second combination, which are representative of the phase differences $\Delta\phi_{REF1}$ and $\Delta\phi_{REF2}$ respectively.

It is therefore understood that, in the example illustrated by FIG. 3 and by virtue of the use of the reference signal $S_{REF}$, the estimation of the direction of arrival of the target signal does not make it necessary to have available:
- the measurement signal $S_{M1}$ received by the first measurement antenna 22a in the course of the second time interval IT2,
- the measurement signal $S_{M2}$ received by the second measurement antenna 22b in the course of the first time interval IT1.

Thus, it is possible to reduce the cost of the system 10 for estimating direction of arrival by pooling certain hardware resources. Indeed, in certain cases, the same hardware resources may be used both for the measurement signal $S_{M1}$ and for the measurement signal $S_{M2}$, in the course of different respective time intervals.

FIG. 4 schematically represents a preferred embodiment of a satellite 20 of a system 10 for estimating direction of arrival. FIG. 4 is a partial representation of the satellite 20 and, in particular, the reception antennas 21 of the telecommunications payload of said satellite are not represented.

In the embodiment illustrated by FIG. 4, the case is considered where the estimation of the direction of arrival is calculated by the ground station 30.

Consequently, the satellite 20 comprises emission means suitable for emitting the measurement signals, received by the array 22 of measurement antennas, destined for the ground station 30. Said emission means comprise for example:
- a mixer 23 and a local oscillator 24 which are suitable for frequentially translating the measurement signals,
- a power amplifier 25,
- an emission antenna 26.

As illustrated by FIG. 4, said emission means are shared between the various measurement antennas of the array 22 of measurement antennas, by means of a switch 27 suitable for connecting each in their turn the outputs of said measurement antennas to the emission means. In the example illustrated by FIG. 4, the array 22 of measurement antennas comprises four measurement antennas 22*a*, 22*b*, 22*c* and 22*d*. In the course of a first time interval IT1, only the output of the first measurement antenna 22*a* is connected to the emission means; in the course of a second time interval IT2, only the output of the second measurement antenna 22*b* is connected to the emission means, etc.

Other hardware resources can be shared between the various measurement antennas, as an alternative or in combination with said emission means.

More generally, at least one hardware resource of chains for processing the measurement signals aboard the satellite 20 is, in preferred embodiments, shared between the various measurement antennas of the array 22 of measurement antennas. Stated otherwise, at least one hardware resource of said processing chains is used to process measurement signals of various measurement antennas of the array 22 of measurement antennas, in the course of different respective time intervals. According to a nonlimiting example, the digitization of the measurement signals being performed aboard the satellite 20, one and the same analog-digital converter is implemented to digitize the measurement signals of various measurement antennas in the course of different respective time intervals. According to another nonlimiting example, one and the same low noise amplifier (LNA) is implemented to amplify, before digitization, the various measurement signals in the course of different respective time intervals. According to another nonlimiting example, one and the same frequency conversion module (for example an assembly comprising a local oscillator, a mixer and a filter) is implemented to frequency translate the various measurement signals in the course of different respective time intervals.

It should furthermore be noted that the fact that only portions of the various measurement signals received in the course of different respective time intervals are transmitted from the satellite 20 to the ground station 30 makes it possible to reduce the bandwidth required for this transmission.

More generally, it should be noted that the modes of implementation and embodiment considered hereinabove have been described by way of nonlimiting examples, and that other variants may consequently be envisaged.

In particular, the invention has been described by considering several reception antennas 21 servicing different geographical zones of the Earth. Nothing excludes, following other examples, consideration of a single reception antenna, for example mounted movably, that can be directed successively toward each of said geographical zones. Such a solution can be envisaged in particular if the reception antenna 21 is dedicated to the estimation of direction of arrival (and is therefore not a reception antenna 21 of a telecommunications payload of the satellite 20).

The description hereinabove clearly illustrates that, through its various characteristics and their advantages, the present invention achieves the objectives that it set itself. In particular, it is understood that, by virtue of the combining with the reference signal, received by a directional reception antenna 21 and exhibiting a good target signal to noise ratio, the dimensions of the measurement antennas can be reduced. Furthermore, it is possible to reuse one or more directional reception antennas 21 of a telecommunications payload, these then advantageously being used both for their telecommunications mission and for an additional mission of estimating direction of arrival.

Estimation of direction of arrival finds numerous applications.

In particular, it is possible to estimate the position of an emitter substantially on the surface of the Earth, such as an interferer. Indeed, if the position of the satellite 20 and its attitude are known in a reference frame associated with the Earth, the knowledge of the direction of arrival of the interference signal emitted by said interferer will make it possible to determine the position thereof.

Furthermore, it is possible to estimate the attitude of the satellite 20. Indeed, if the position of the satellite 20 is known, the knowledge of the directions of arrival of target signals emitted by one or more emitters of known position will make it possible to estimate the attitude.

The invention claimed is:

1. A method for estimating a direction of arrival of a target signal with respect to an array of measurement antennas of a satellite in terrestrial orbit, comprising the steps of:
   estimating the direction of arrival of the target signal as a function of measurement signals, corresponding to the target signal received by respectively at least a first measurement antenna and a second measurement antenna of the array of measurement antennas;
   combining each of the measurement signals with a reference signal corresponding to the target signal received by a reception antenna of the satellite having a maximum gain greater than respective maximum gains of the first measurement antenna and of the second measurement antenna; and
   estimating the direction of arrival of the target signal on the basis of the signals obtained by combining each of the measurement signals with the reference signal.

2. The method as claimed in claim 1, wherein the satellite comprises a plurality of reception antennas servicing various geographical zones of the Earth, each reception antenna having a maximum gain greater than respective maximum gains of the first measurement antenna and of the second measurement antenna; and further comprising the steps of determining the reception antenna for receiving the target signal and utilizing the signal received by the determined reception antenna as the reference signal.

3. The method as claimed in claim 1, further comprising the steps of:
   calculating a first combination between the reference signal and the measurement signal that are received by respectively the reception antenna and the first measurement antenna in the course of a first time interval;
   calculating a second combination between the reference signal and the measurement signal that are received by respectively the reception antenna and the second measurement antenna in the course of a second time interval distinct from the first time interval; and
   estimating the direction of arrival of the target signal as a function at least of the first combination and of the second combination.

4. The method as claimed in claim 3, further comprising the step of processing both the measurement signal of the first measurement antenna and the measurement signal of the second measurement antenna in the course of different respective time intervals by at least one hardware resource of processing chains aboard the satellite.

5. The method as claimed in claim 4, further comprising the step of processing both the measurement signal of the first measurement antenna and the measurement signal of the second measurement antenna in the course of different respective time intervals by an analog-digital converter, a low noise amplifier or a frequency conversion module.

6. The method as claimed in claim 1, wherein the target signal is at least one of an intermittent signal or a time varying frequency signal.

7. A method for estimating a position of an emitter substantially on the surface of the Earth as a function of a direction of arrival estimated for a target signal emitted by the emitter in accordance with claim 1.

8. A method for estimating an attitude of a satellite in terrestrial orbit as a function of a direction of arrival estimated, for a target signal emitted by an emitter of a known position with respect to the satellite, in accordance with claim 1; and wherein the satellite comprises at least a first measurement antenna, a second measurement antenna and a reception antenna having a maximum gain greater than respective maximum gains of the first measurement antenna and of the second measurement antenna.

9. A system for estimating a direction of arrival of a target signal, comprising:
   a satellite in terrestrial orbit comprising an array of measurement antennas;
   a processor for estimating the direction of arrival of the target signal as a function of measurement signals corresponding to the target signal received by respectively at least a first measurement antenna and a second measurement antenna of the array of measurement antennas;
   a circuit to combine each of the measurement signals with a reference signal corresponding to the target signal received by a reception antenna of the satellite having a maximum gain greater than respective maximum gains of the first measurement antenna and of the second measurement antenna; and
   wherein the processor estimates the direction of arrival of the target signal on the basis of the signals obtained by combining each of the measurement signals with the reference signal.

10. The system as claimed in claim 9, wherein the satellite comprises a plurality of reception antennas servicing various geographical zones of the Earth, each reception antenna having a maximum gain greater than respective maximum gains of the first measurement antenna and of the second measurement antenna, the first measurement antenna and the second measurement antenna servicing all the geographical zones serviced by the plurality of reception antennas.

11. The system as claimed in claim 9, wherein the satellite comprises processing chains to process the measurement signals, the processing chains comprising at least one shared hardware resource configured to process both the measurement signal of the first measurement antenna and the measurement signal of the second measurement antenna in the course of different respective time intervals.

12. The system as claimed in claim 11, wherein at least one shared hardware resource of the processing chains of the satellite is an analog-digital converter, a low noise amplifier or a frequency conversion module.

13. The system as claimed in claim 9, wherein the satellite is a telecommunications satellite or a satellite for observation of artificial signals emitted from the Earth; and wherein the reception antenna is a reception antenna for a telecommunications or observation payload of the satellite.

14. The system as claimed in claim 9, wherein the satellite is in geostationary orbit; and wherein each of the first measurement antenna and the second measurement antenna exhibits a field of view of width greater than 3°.

15. The system as claimed in claim 14, wherein each of the first measurement antenna and the second measurement antenna exhibits a field of view of width greater than 10°.

* * * * *